United States Patent [19]
Alvelda

[11] Patent Number: 5,940,159
[45] Date of Patent: *Aug. 17, 1999

[54] COLOR MICRODISPLAYS AND METHODS OF MANUFACTURING SAME

[75] Inventor: Phillip Alvelda, Somerville, Mass.

[73] Assignee: Massachusetts Institute of Technology, Cambridge, Mass.

[*] Notice: This patent is subject to a terminal disclaimer.

[21] Appl. No.: 09/062,097

[22] Filed: Apr. 17, 1998

Related U.S. Application Data

[63] Continuation of application No. 08/543,088, Oct. 13, 1995, Pat. No. 5,742,373.

[51] Int. Cl.[6] .............................. G02F 1/13; G02F 1/1335
[52] U.S. Cl. ........................ 349/202; 349/57; 349/95; 349/201; 349/108
[58] Field of Search .................................. 349/204, 201, 349/202, 108, 57, 95; 428/1

[56] References Cited

U.S. PATENT DOCUMENTS

| | | | |
|---|---|---|---|
| 4,256,787 | 3/1981 | Shaver et al. | 428/1 |
| 5,013,141 | 5/1991 | Sakata | 350/348 |
| 5,299,289 | 3/1994 | Omae et al. | 359/95 |
| 5,742,373 | 4/1998 | Alvelda | 349/204 |

*Primary Examiner*—William L. Sikes
*Assistant Examiner*—Julie Ngo
*Attorney, Agent, or Firm*—Testa, Hurwitz & Thibeault, LLP

[57] ABSTRACT

A color microdisplay utilizes diffraction gratings to provide an array of high efficiency color pixels. The microdisplay includes a semiconductor substrate and source of light disposed adjacent thereto. A cover plate may be disposed above the substrate and has a layer of conductive material on a surface of the cover plate opposite the substrate. An optically active material, such as liquid crystal material, may be disposed between the substrate and the cover plate. An array of pixels are formed on the substrate. The pixel array includes an array of diffraction grating elements. Each element includes one or more diffraction gratings. The pitch of each diffraction grating can be a function of the angle of the incident light and the desired diffraction output spectrum. An optical system directs the diffracted light from each grating through the optically active material into viewing optics.

20 Claims, 4 Drawing Sheets

COLOR MICRODISPLAYS AND METHODS OF MANUFACTURING SAME

This application is a continuation of Ser. No. 08/543,088, filed Oct. 13, 1995, now U.S. Pat. No. 5,742,373.

GOVERNMENT RIGHTS

This invention was made with government support under Grant(s) number N00014-94-1-0249 awarded by the Department of the Navy. The government has certain rights in the invention.

FIELD OF THE INVENTION

The invention relates generally to color generation devices and methods for manufacturing such devices. In particular, the invention relates to color microdisplays and methods for manufacturing such microdisplays.

BACKGROUND

Display technology is currently dominated by cathode-ray-tube (CRT) displays and liquid crystal displays (LCDs). Although CRT displays are well understood and typically inexpensive to manufacture, LCDs have advantages in power, size and safety. Extensive research in LCD technology has led to the development of large, high-resolution displays using addressable matrix scanning techniques and, more recently, active matrix techniques. Using either technique, narrow band or full color LCDs can be fabricated.

Presently, industry-standard color LCDs are fabricated using one of several technologies. A common approach involves the formation of pixel triads on the CMOS, BICMOS, NMOS, or other microcircuit substrate (e.g., silicon) to achieve full color (see FIG. 1). More specifically, each pixel is replicated three times, and a mosaic of red blue and green gel filters is placed over each pixel triad. A transparent conductor is deposited on the inside surface of a cover layer. Spacers are applied to either the substrate or the cover layer, and the two are bonded together. The region between the substrate and cover layer is filled with liquid crystal material. Polarizers may also be laminated over the cover layer.

Because pixel triads are used, the resolution of the display is decreased by a factor of three. Moreover, the transmitted light through the liquid crystal region passes through the polarizers and color filters, typically reducing the incident illumination to four percent (4%) or less. Thus, this approach can be regarding as an inefficient solution to generating a high-efficiency, color display. While slight improvements are under development using subtractive color filters and dichroic combiners, the expected efficiencies only approach twelve percent (12%).

Another approach for making color LCDs involves the use of filters formed from diffraction gratings. However, color microdisplays with diffraction-based pixels and convenient methods for manufacturing such displays inexpensively are not previously known.

SUMMARY OF THE INVENTION

The present invention features color generation devices and methods which utilize diffraction-based color pixels to provide full color reflection-mode or transmission-mode microdisplays. A diffraction-based color display operates by illuminating an array of pixels, each including a diffraction grating element, with light from a source. Each element includes one or more small diffraction gratings. The source may be at least one incandescent bulb, cold-cathode bulb, LED, white light bulb, pseudo-white light or tri-band bulb. When white light (for example) illuminates the pixels, a rainbow pattern of light (i.e., a diffracted spectrum) is diffracted from or transmitted through each grating and redirected to viewing optics according to the grating configuration.

Each element may comprise, for example, a triad of diffraction gratings. If the pitch of each grating in each triad is different, the angular direction of the diffracted spectrum differs for each grating. In other words, each grating per triad diffracts the color components of the incident light into different directions. Thus, if each grating per triad has a slightly different pitch, the diffracted light from each grating appears as a different color when viewed from a single angle. Drive and address circuitry selectively activates the optically active material adjacent to one or more gratings to produce any desired combined color for each triad.

Each element may comprise a single diffraction grating. Each grating is configured to combine the color components of incident light (from multiple sources) and direct the combination in a specific direction. Once again, drive and address circuitry selectively activates the optically active material to produce any desired combined color for each element.

In one aspect, the invention features a method for manufacturing a diffraction-based color generation device. An array of pixels are formed on a semiconductor substrate (e.g., silicon, quartz, gallium arsenide, indium phosphide, or mercury cadmium telluride) using a CMOS, BICMOS, NMOS, or other microcircuit process. More specifically, an array of diffraction grating elements are formed on the substrate for each pixel. Each element includes one or more diffraction gratings. The array of diffraction grating elements may be a planar array which is patterned in a layer of metalization deposited on the substrate during the microcircuit process. The pitch of each diffraction grating per element may be optimized as a function of the angle of incident light, such that each pixel diffracts color components of the incident light into specific directions.

The direction of the diffracted spectra is also a function of the grating pitch. More specifically, the grating pitch and distribution in combination with the effects of dispersion are precisely configured to diffract a selected color of the diffracted spectrum through viewing optics. Further, each grating may be "blazed" such that most of the diffracted light through the viewing optics is a single order. The individual strip patterns of each grating are fabricated so the grating casts most of the diffracted spectrum into the angular direction of a single order.

The method also includes positioning a source of light adjacent to the pixel array to provide incident light to the diffraction grating elements. The source may provide collimated light or non-collimated light. Further, the source may comprise a white light, pseudo-white or tri-band emitter, or multiple narrow band (e.g., red, green, and blue) emitters. A cover plate is disposed above the substrate and has a layer of conductive material, such as indium tin oxide (ITO), on a surface of the cover plate opposite the substrate. An optically active material, such as liquid crystal material, is disposed between the substrate and the cover plate.

The method also includes positioning a system of optical elements adjacent to the substrate which images the diffracted light and may magnify the pixel array. Further, the system presents images to the eye of the viewer. Examples of such imaging optics include magnifying or afocal eyepieces.

The method also includes forming an array of driving and addressing circuitry on the substrate. The driving and addressing circuitry may be based on a three-transistor DRAM or SRAM architecture and provides column and row selection for activating each pixel. An array of optical elements is formed adjacent the array of pixels for directing the primary colors for each pixel into the optically active material.

In another aspect, the invention features a color generation device. The device includes an array of pixels disposed on a semiconductor substrate. The pixel array includes an array of diffraction grating elements, including one or more diffraction gratings, formed in a layer of metalization deposited on the substrate using a microcircuit process. For each element, the pitch of each diffraction grating may be optimized as a function of the angle of incident light, such that each pixel diffracts incident light into a spectrum of the colors. More specifically, each pixel diffracts color components of the incident light into specific directions. Further, each grating may be blazed such that most of the diffracted spectrum is of one order.

A source of light is disposed adjacent the pixel array to supply light to the diffraction grating elements. The source may provide collimated light or non-collimated light. Further, the source may include a white light emitter or multiple narrow band (e.g., red, green, and blue) emitters. A cover plate is disposed above the substrate and has a layer of conductive material on a surface of the cover plate opposite the substrate. The conductive material serves as an electrode for the pixel array. The pixel array also includes an array of driving and addressing circuitry disposed on the substrate and providing column and row selection for activating each pixel. An optically active material is disposed between the substrate and the cover plate. An array of optical elements is disposed adjacent to the array of pixels for directing diffracted colors for each pixel through the optically active material into or to the eye of the viewer.

High-performance liquid crystal-on-silicon color microdisplays suitable for virtual imaging applications have been fabricated in accordance with the claimed methods. For example, a color microdisplay can be mounted in a pair of eyeglasses to provide a virtual reality display.

BRIEF DESCRIPTION OF THE DRAWINGS

The foregoing and other objects, features and advantages of the invention will become apparent from the following more particular description of preferred embodiments of the invention, as illustrated in the accompanying drawings.

DETAILED DESCRIPTION

Figure 1:
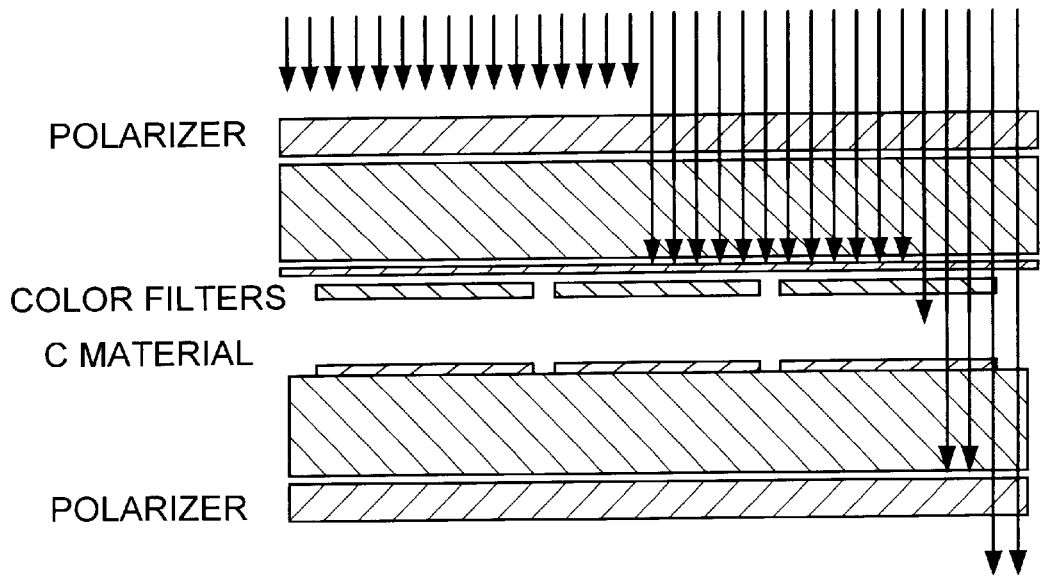
FIG. 1 is a partial cross-sectional view of the polarizes, color filters and liquid crystal material in a conventional liquid crystal color display.
Figure 2:
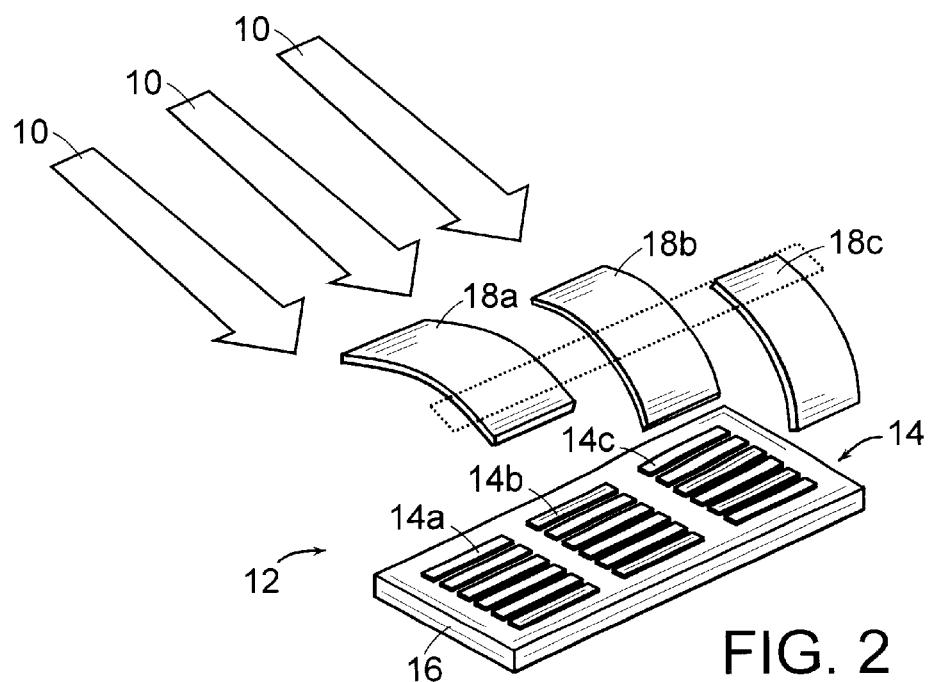
FIG. 2 is a perspective view of a reflected-mode diffraction grating element comprising a triad of diffraction gratings fabricated on a semiconductor substrate using a microcircuit process.

The present invention features diffraction-based color microdisplay and methods for manufacturing diffraction-based color microdisplays. A diffraction-based color display operates by illuminating an array of pixels, each including a diffraction grating element comprising one or more diffraction gratings, with light. Referring to FIG. 2, a light source (not shown) provides collimated white light 10 to illuminate a pixel 12. The pixel includes a diffraction grating element 14 formed on a semiconductor substrate 16 using a CMOS, BICMOS, NMOS, or other microcircuit process. The diffraction grating element 14 comprises a triad of diffraction gratings 14a–c. A rainbow pattern of light 18a–c (i.e., a diffracted spectrum) is reflected from each grating 14. The period of each grating is different, so that the diffracted spectrum for each grating is offset slightly relative to the other gratings in the triad. In other words, the angular direction of the diffracted spectrum differs for each grating. Thus, if each pixel triad is viewed from a single angle, the light diffracted from each grating of the triad appears as a different color.

Figure 3:
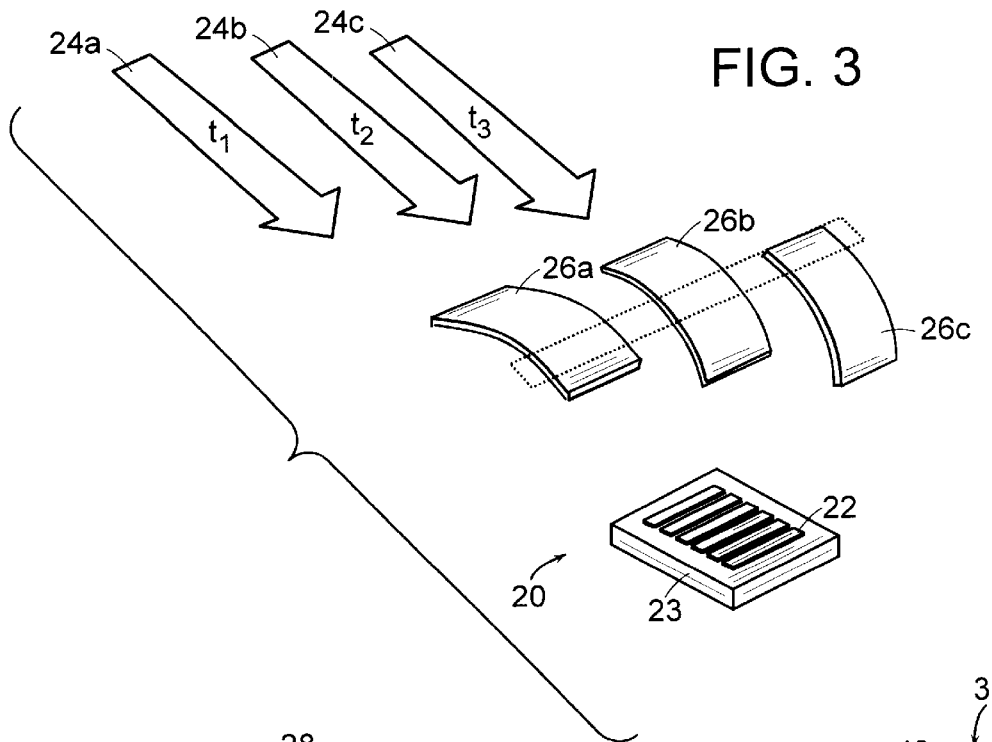
FIG. 3 is a perspective view of a diffraction grating element comprising a single diffraction grating fabricated on a semiconductor substrate using a CMOS, BICMOS, NMOS, or other microcircuit process.

In another embodiment, shown in FIG. 3, a pixel 20 comprises a single diffraction grating 22 formed on a semiconductor substrate 23. Three narrow band light sources (not shown) illuminate the pixel with collimated narrow band light beams 24a–c in a sequential process. By way of example, the pixel is illuminated with a red illuminator at time $t_1$, blue illuminator at time $t_2$, and green illuminator at time $t_3$. Spectra 26a–c are diffracted from or through the grating in response to the incident narrow band light beams. The single grating is configured so that each incident light beam from the precisely offset red, green and blue sequential illuminators are combined by the grating to diffract in the same direction. By viewing the diffracted beam, the pixel appears as a different color at time $t_1$, $t_2$ and $t_3$. When the red, green and blue illuminators are cycled at sufficiently high speed, the viewer perceives a single color which is the additive combination of the diffracted narrow band beams. In effect, the device acts as a color combiner which reduces glare and increases contrast.

Referring back to FIG. 2, there are three main criteria in the design of triad grating structures: period, duty-cycle, and the number of strips per gating. To understand how these can be optimized, a brief review of grating theory is provided.

A diffraction grating is a periodic structure which changes the wavefront of incident light through interference. Diffraction gratings can be designed to affect either the amplitude or the phase of incoming light, to deflect intensity maxima in particular directions. By varying the pitch, duty-cycle, and the number of strips each grating, the direction of the maxima can be varied. For a diffraction grating of n, ideally-narrow lines each separated by a distance d, the complex amplitude using the grating center as a phase reference is, $$A(\phi, \delta) = A_0 \frac{\sin\left(\frac{n\pi d}{\lambda}\sin\phi + \frac{n\delta}{2}\right)}{\sin\left(\frac{\pi d}{\lambda}\sin\phi + \frac{\delta}{2}\right)} \quad (1)$$

where $$\delta = \frac{2\pi d}{\lambda}\sin\phi_0,$$

and $\phi_o$ is the fixed angle of incidence.

The orders, or diffraction maxima have equal spacing in $\sin\phi$, and occur when the numerator and denominator of the previous equation tend to zero together. This happens when $$\frac{\pi d}{\lambda}\sin\phi + \frac{\delta}{2} = N\pi \quad (2)$$

or when $$\sin\phi = -\frac{\delta\lambda}{2\pi d} + \frac{N\lambda}{d} \quad (3)$$

where N is the order number. So, $\delta$ is the phase shift per line caused by the angle of illumination, and affects the position of the orders. The order spacing, on the other hand, $$(\sin\phi)_N - (\sin\phi)_{N-1} = \frac{\lambda}{d} \quad (4)$$

is determined by the grating pitch d and the wavelength of illumination.

When the effect of the each strip's width and hence the duty-cycle of the grating is considered, the diffraction pattern of the whole grating appears only in the directions in which the individual lines would diffract light. Thus, the diffraction pattern of the entire grating is the product of the intensity pattern of a single line with the intensity pattern for the ideal grating.

To determine the number of strips for each grating, the aperture distribution function (i.e., the extent of the grating) is convolved with the diffraction pattern from the last paragraph. The smaller the extent of the aperture function (i.e., the fewer strips in the grating), the greater the extent of the diffracted maxima. In other words, when more strips are added to a grating, the diffraction maxima width decreases, and the color bands in the triad become more distinct.

The general case involves three convolutions: the individual strip top-hat function; with the periodic grating impulse response function; with the top-hat function of the grating extent. The result is a narrow sinc function under a wide sinc function envelope. The product is a series of diffracted beams of finite width which decay in intensity with increasing order. After doing the convolution of a boxcar function with a periodic delta function, there should be at least nine strips in the grating structure to separate the primary color (e.g., red, blue, and green) wavelengths. This results in a tradeoff in resolution because each strip must be separated by at least a micron, meaning the minimum size of a single color pixel in a RGB triad is twenty-five microns in length. However, this allows more space for slightly larger high-voltage transistors used to drive the optically active materials.

The invention includes the recognition that various optimization techniques may be utilized to maximize the efficiency of the diffraction gratings for each primary color band. One technique is a "blazing." By way of background, the combination of individual strip patterns within the overall grating pattern can produce the effect of "missing orders". For instance, if a grating of pitch d is composed of lines of width w, and d/w is a rational fraction, then a zero of the line diffraction pattern will fall on a maximum of the grating pattern, and this order will not appear. Thus, it is possible to remove orders by choosing the duty-cycle relative to the pitch. Moreover, the grating can be designed so that most of the light goes into one order. These are called blazed gratings. The lines are ruled so each grating casts its diffracted spectrum in the direction of the desired order.

Figure 4A:
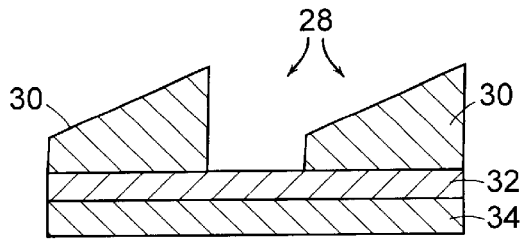
FIG. 4a is a partial cross-sectional view of a ruled-metal blazed diffraction grating.
Figure 4D:
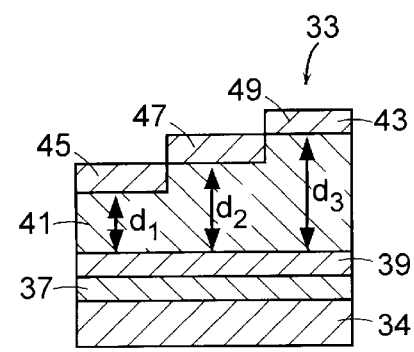
FIG. 4d is a partial cross-sectional view of blazed diffraction gratings with varying oxide thicknesses to optimize phase grating diffraction efficiency.
Figure 4B:
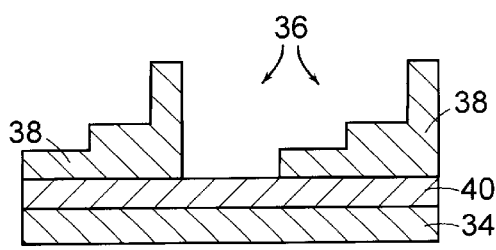
FIG. 4b is a partial cross-sectional view of a step-etched metal blazed diffraction grating.
Figure 4E:
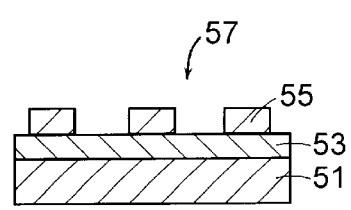
FIG. 4e is a partial cross-sectional view of blazed diffraction gratings for a tramsmitted mode display.
Figure 4C:
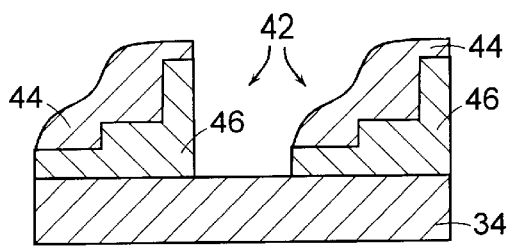
FIG. 4c is a partial cross-sectional view of a blazed diffraction grating in which metal is disposed over a step-etched oxide layer.

FIGS. 4a–g illustrate various forms of blazed diffraction gratings. In FIG. 4a, a blazed diffraction grating 28 is formed by patterning a metalization layer 30. The layer 30 is disposed on an oxide layer 32 which is deposited on a semiconductor substrate 34. FIG. 4b illustrates a blazed diffraction grating 36 having a step profile. A metalization layer 38 disposed on an oxide layer 40 is step etched to produce the resulting profile. In FIG. 4c, a blazed diffraction grating 42 is formed by depositing a metalization layer 44 over an oxide layer 46 etched or otherwise patterned to have a step (or sawtooth) profile. The oxide layer is deposited on the substrate 34 and step etched.

Figure 4F:
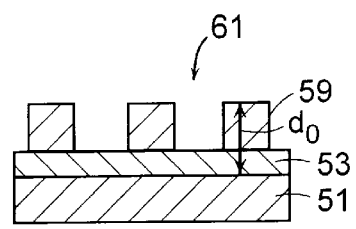
FIG. 4f is a partial cross-sectional view of blazed diffraction gratings for a tramsmitted mode display with varying oxide thicknesses to optimize phase grating diffraction efficiency.

In FIG. 4d, a blazed diffraction grating triad 33 is formed by depositing an oxide layer 37 over the substrate 34. The thickness ($d_1$, $d_2$, $d_3$) of the oxide layer 41 between the top metalization layer 43 (used to form the grating) and the underlying metalization layer 39 (used as a rear reflector for a phase grating) is varied to optimize phase diffraction efficiency for the selected color (wavelength) for each individual grating 45,47,49. In FIG. 4e, a blazed diffraction grating triad 57 for a transmitted mode display includes an oxide layer 53 formed over a transparent substrate 51. A metalization layer 55 is deposited over the oxide layer 53 etched or otherwise patterned to form an intensity grating triad. In FIG. 4f, a blazed diffraction grating triad 61 for a transmitted mode display includes an oxide layer 53 formed over a transparent substrate 51. Another oxide layer 59 is deposited over the oxide layer 53 and etched or otherwise patterned to form the grating triad. The thickness ($d_o$) of the two oxide layers is varied to optimize phase diffraction efficiency for each grating in the triad 61.

It is noted that in FIGS. 4a–f, the layer 34 may be an absorber such as polysilicon to form an intensity grating of reflecting metal strips alternating with absorbing polysilicon strips. Alternatively, layer 34 may be a metal to form a surface relief-type phase grating between the top two layers of metalization. It is also noted, for convenience, FIGS. 4a–f depict only selected layers of the circuit and grating fabrication process.

It is noted that other forms of blazed diffraction gratings are within the scope of the invention. For example, a "virtual" blazing process may be used to provide a blazed diffraction grating. Virtual blazing involves adjusting the width and spacing of individual strips to maximize reflection for a single order.

Pitch optimization is another technique that may be utilized to maximize the efficiency of the diffraction gratings over the entire field of the display and to compensate for uncollimated light. A diffraction grating has a pitch d which is related to the wavelength in the canonical grating equation:

$$\sin\phi = N\frac{\lambda}{d} \qquad (5)$$

where $\lambda$ is the wavelength and N is the order number. It follows from equation (5) that pitch d can be tuned to maximize diffraction efficiency for each primary color band (or wavelength) independently.

Figure 4G:
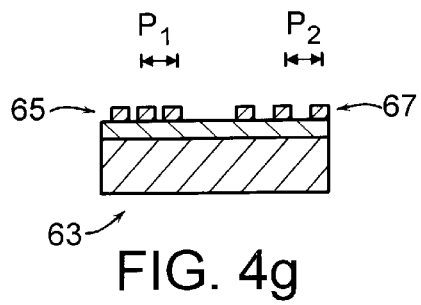
FIG. 4g is a partial cross-sectional view of blazed diffraction gratings with varying pitch across the display.

In one example, shown in FIG. 4g, a display has a single uncollimated light source (not shown) adjacent to a pixel array 63 having two pixel gratings 65,67 at different position which should produce the same color output (other gratings are contemplated but not shown). At different positions on the substrate, the illumination is incident from different angles. Thus, the grating pitch ($p_1$, $p_2$) varies across the substrate to compensate for the changing incident angle of the uncollimated light. This results in uniform color across the entire display area despite a lack of collimation.

Figure 4H:
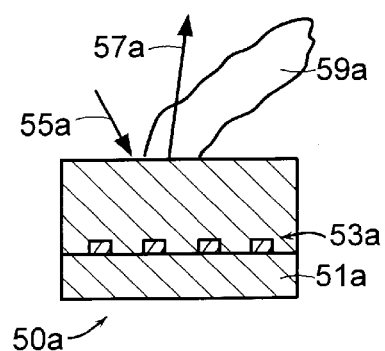
FIG. 4h is a partial cross-sectional view of a display including diffraction gratings instead of reflective pixel electrodes.

FIG. 4h illustrates a display 50a including diffraction gratings 53a, disposed on a substrate 51a, instead of reflective pixel electrodes. Incoming light 55a and resulting diffracted light 57a are shown. The gratings 53a serve to displace a large portion of the unwanted back-scattered illumination 59a in the OFF state away from the optical axis of the display, which is aligned along the first-order diffracted beam 57a.

Figure 4I:
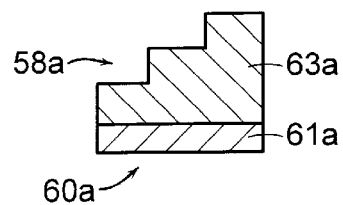
FIG. 4i is a partial cross-sectional view of a blazed diffraction grating for another tramsmitted mode display with varying oxide thicknesses to optimize phase grating diffraction efficiency.

In FIG. 4i, a blazed diffraction grating triad 58a for a transmitted mode display 60a includes an oxide layer 63a formed over a transparent substrate 61a. The thickness of the oxide layer is varied to form a phase grating triad.

Figure 5A:
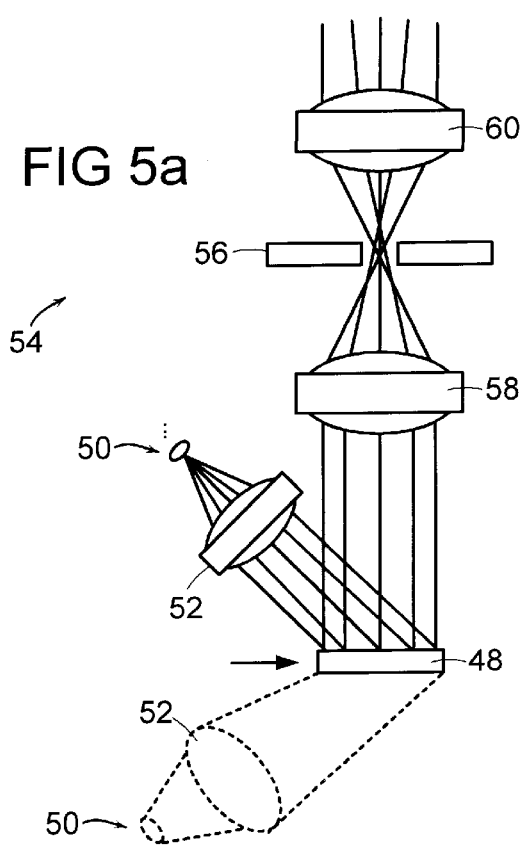
FIG. 5a is a side view of an optical layout for single source reflected mode or transmitted mode color generation device.

FIG. 5a illustrates the imaging system of a color generation device of the invention. An array of diffraction grating triads are disposed on a substrate 48. A point source 50 emits light that is collimated by a lens 56. Based on the foregoing, the dispersive properties of gratings enable them to be used as color filters, where the dispersion relation is the canonical grating equation. The imaging system 54 includes a stop 56 to accept only a small range of angles $\phi_o \pm \delta\phi$, so only the spectral range $\lambda_o \pm \delta\lambda$ is passed through the stop 56. For each diffraction grating triad, three different grating pitches are provided such that the first-order reflected beams of three different wavelengths pass through the stop 52. More specifically, a lens 58 directs the reflected beams through the stop to a second lens 60.

In one example, for a prototype microdisplay fabricated in accordance with the principles of the invention, the grating periods were rounded to the nearest tenth-micron to suit the fabrication process limitations. For each diffraction grating triad, the blue period was 2.0 microns, the green period was 2.3 microns, and the red period was 2.7 microns. It is noted that the ratio of the three periods is important, not the absolute numbers. Any three grating pitch values that preserve the ratios between the desired diffracted colors is appropriate for the diffraction color filter effect. The colors were chosen to match, and slightly improve upon, the NTSC specification. It is noted that other microdisplays can be readily fabricated in accordance with the known PAL, SECAM, KGB, VGA and SVGA specifications.

Figure 5B:
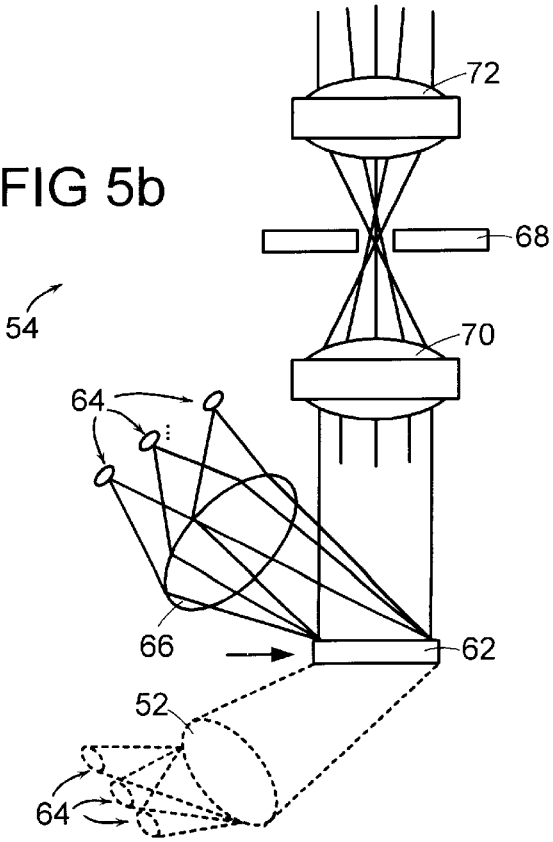
FIG. 5b is a side view of an optical layout for multiple source reflected mode or transmitted mode color generation device.

FIG. 5b illustrates the imaging system of another color generation device of the invention. An array of diffraction grating elements (with one or more gratings per element) are disposed on a substrate 62. A plurality of point sources 64 emit light that is collimated by a lens (or a system of lenses) 66. A stop 68 accepts only a small range of angles. For each diffraction grating element, the grating pitches are provided such that the first-order reflected beams of the different wavelengths pass through the stop 68. A system of lenses 70, 72 directs the reflected beams through the stop and out of the display for viewing.

Figure 6:
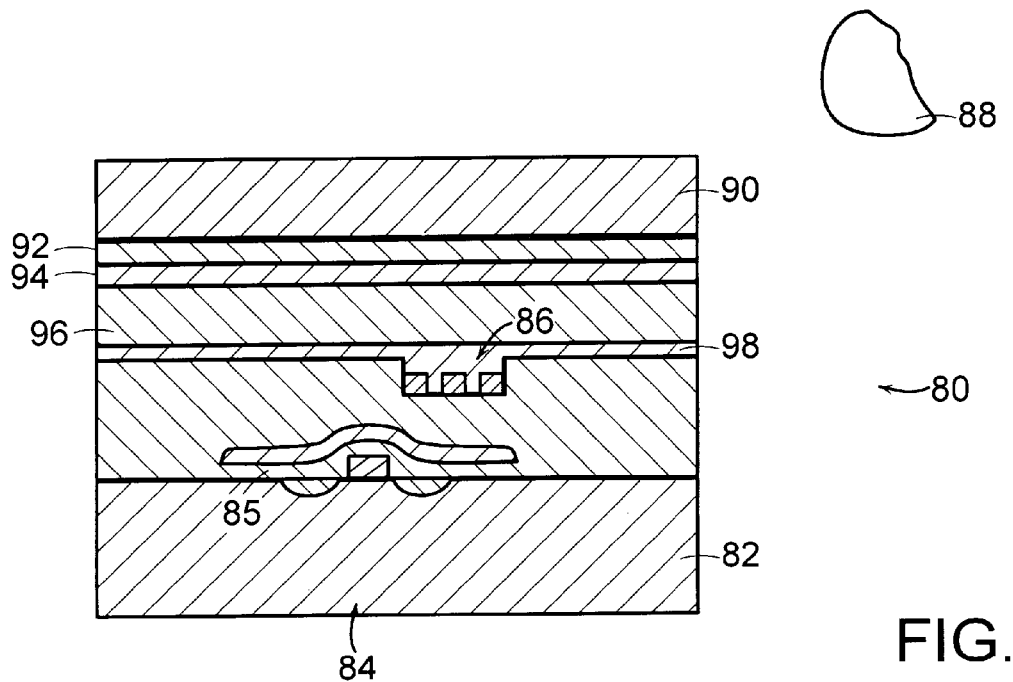
FIG. 6 is a cross-sectional view of a color generation device incorporating the principles of the invention.

With reference to FIG. 6, a color microdisplays 80 includes a semiconductor substrate 82. Each pixel 84 can based on a DRAM, SRAM, raster scan or any other array address and storage architecture with both column and row selects as well as either active or passive data storage circuitry. The data storage node of each pixel is connected to the pixel electrode on the top layer of metalization which is shaped into at least one grating. As shown, a triad 86 of gratings is formed in the top layer of aluminum metalization during the microcircuit process. The optical efficiency is then only limited by the first-order diffraction efficiency of the gratings. The gratings 86 are positioned to shield the transistor 85 from illumination in order to avoid photocurrent which drains the charge stored at each pixel.

A source 88 of light is disposed adjacent the structure to supply incident light to the diffraction grating elements. The source may provide collimated light or non-collimated light. Further, the source may include a white light emitter or multiple narrow band (e.g., red, green, and blue) emitters. The source may be incandescent, cold cathode, fluorescent, tri-band lamp fluorescent, or an LED. A cover plate 90 is disposed has a layer of conductive material 92 (e.g., ITO) on an inner surface adjacent an alignment layer 94. The conductive material serves as an electrode for the pixel array. An optically active material 96 (e.g., liquid crystal materials and known operating modes including TN, STN, ECB, PDLC, FLC, DHFLC, AFLC) is disposed between the substrate and the cover plate. An array of optical elements 98 may be disposed adjacent the array of pixels for directing the colors for each pixel through the optically active material to the eye of the viewer.

Figure 7:
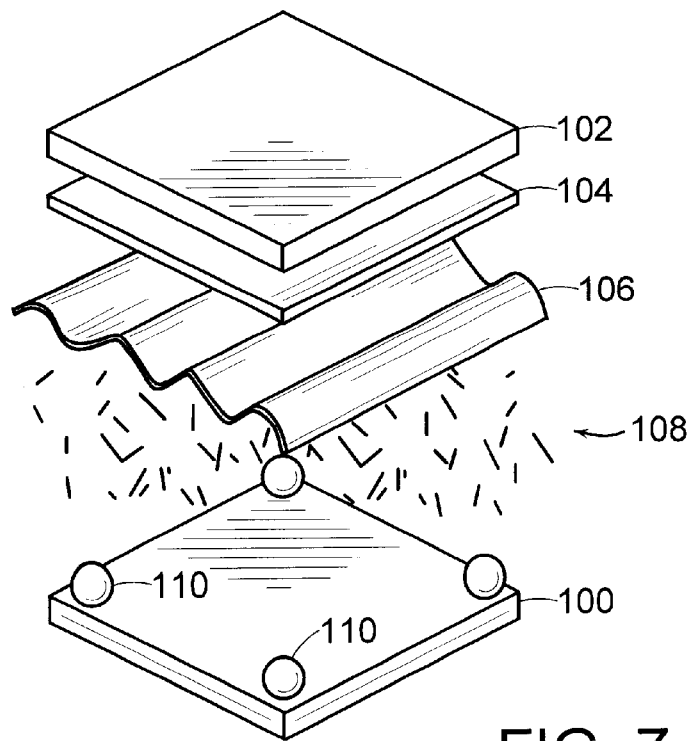
FIG. 7 is an illustration of a method for assembling a color generation device having a cover layer, optically active material, spacers and semiconductor substrate.

Referring to FIG. 7, a process for fabricating a color microdisplay is shown. An array of reflection-mode pixels are formed on a semiconductor substrate 100 (e.g., silicon) using a CMOS, BICMOS, NMOS, or other microcircuit process. More specifically, an array of diffraction grating elements (including one or more diffraction gratings) are formed on the substrate for each pixel (FIGS. 2, 3 and 4a–4g). The array of elements may be a planar array which is patterned in a layer of metalization deposited on the substrate during the microcircuit process. For each triad, the pitch of each diffraction grating may be optimized as a function of the angle of incident light, such that each pixel diffracts the proper color into the viewing optics (FIGS. 5a–5b). Further, each grating may be blazed such that most of the reflected light is concentrated in a single order (FIGS. 4a–4g).

The method also includes positioning a source of light adjacent to the pixel array to supply incident light to the diffraction grating triads (FIG. 6). A cover plate 102 is disposed above the substrate and has a layer of conductive material 104, such as indium tin oxide (ITO), on a surface of the cover plate opposite the substrate. An optional alignment layer 106 may be formed adjacent to the layer of conductive material. An optically active material 108, such as liquid crystal, electrochromic or active semiconductor materials, is disposed between the substrate and the cover plate. Spacers 110 are positoned on the substrate.

The method also includes forming an array of driving and addressing circuitry on the substrate. The driving and addressing circuitry may be based on a on a DRAM, SRAM, raster scan or any other array address and storage architecture and provides column and row selection for activating each pixel. An array of optical elements is formed adjacent the array of pixels for directing the colors for each pixel through the optically active material to the eye of the viewer.

Intensity Modulating Materials

Color microdisplays incorporating the principles of the invention are designed to support several different modes of operation using various optical intensity modulating materials, as the color generation mechanism is independent of the intensity modulation. For example, where resolution and frame rate are critical, fast ferroelectric or nematic materials and modes in thin gapped cells are appropriate.

Other modes of operation using polymer dispersed or scattering-type liquid crystals are well suited to slower or lower resolution applications. This configuration does not require polarizes or surface preparation for liquid crystal alignment. This mode is also extremely robust in the face of exposed grating structures and other problems with surface contamination or general lack of planarity. Assembly of the PDLC cells is also greatly simplified as there is no back-fill after sealing required since the sealing and filling processes are one in the same. Additionally, the scattering-to-transparent mode of operation is quite robust with respect to cell thickness variation and contamination. Thin gapped electronically controlled birefringence modes are appropriate for a wide range of applications in combination with microdisplay color diffraction grating filters and combiners. The reflected mode of operation boosted contrast ratios considerably with two passes through the PDLC material, effectively doubling the effective scattering for a given driving voltage.

The reflected mode intensity grating is fabricated with a single level of metalization over the polysilicon line-select bus with the intent of having the lowest reflectivity background and finest grating pitch possible. The transmitted mode intensity grating is fabricated with a single layer of metalization over a transparent area of the substrate.

The transmitted mode phase grating is fabricated using varying thicknesses of oxide which leads to a relative phase lag. This grating structure has the potential to be much more efficient than the intensity-based grating if the relative phase lag of the varied oxide thicknesses is roughly one-half the wavelength of light to be diffracted.

Equivalents

While the invention has been particularly shown and described with reference to specific preferred embodiments, it should be understood by those skilled in the art that various changes in form and detail may be made therein without departing from the spirit and scope of the invention as defined by the appended claims.

I claim:

1. A method for manufacturing a color generation device comprising:

providing a semiconductor substrate; and forming an array of pixels on the substrate, which comprises a) forming a planar array of diffraction grating elements, such that each pixel diffracts color components of incident light into a single order having a specific direction; and b) forming an array of driving and addressing circuitry on the substrate.

2. The method of claim 1 wherein each diffraction grating element comprises a triad of diffraction gratings.

3. The method of claim 2 wherein each diffraction grating acts as a color filter.

4. The method of claim 1 wherein each diffraction grating element comprises a single diffraction grating.

5. The method of claim 2 further comprising blazing each diffraction grating.

6. The method of claim 4 further comprising blazing each diffraction grating.

7. The method of claim 4 wherein each diffraction grating acts as a color filter.

8. The method of claim 1 wherein the incident light is provided by a light source.

9. The method of claim 1 wherein the pitch of each diffraction grating element is a function of the angle of the incident light.

10. A method for manufacturing a color generation device comprising:

providing a semiconductor substrate;

forming an array of pixels on the substrate, which comprises forming a planar array of diffraction grating elements each having a pitch which compensates for incident uncollimated light, such that each pixel diffracts color components of incident light into a specific direction.

11. The method of claim 10 wherein an array of driving and addressing circuitry is formed on the substrate.

12. The method of claim 10, wherein an incident light is provided by a light source.

13. The method of claim 10 wherein the source comprises at least one white light source, a pseudo-white light source or tri-band light source.

14. The method of claim 10 wherein the source of light comprises multiple narrow band light sources.

15. The method of claim 10 wherein each diffraction grating element comprises a triad of diffraction gratings.

16. The method of claim 15 further comprising blazing each diffraction grating.

17. The method of claim 15 wherein each diffraction grating acts as a color filter.

18. The method of claim 10 wherein each diffraction grating element comprises a single diffraction grating.

19. The method of claim 18 further comprising blazing each diffraction grating.

20. The method of claim 18 wherein each diffraction grating acts as a color filter.

* * * * *